United States Patent Office 2,939,422
Patented June 7, 1960

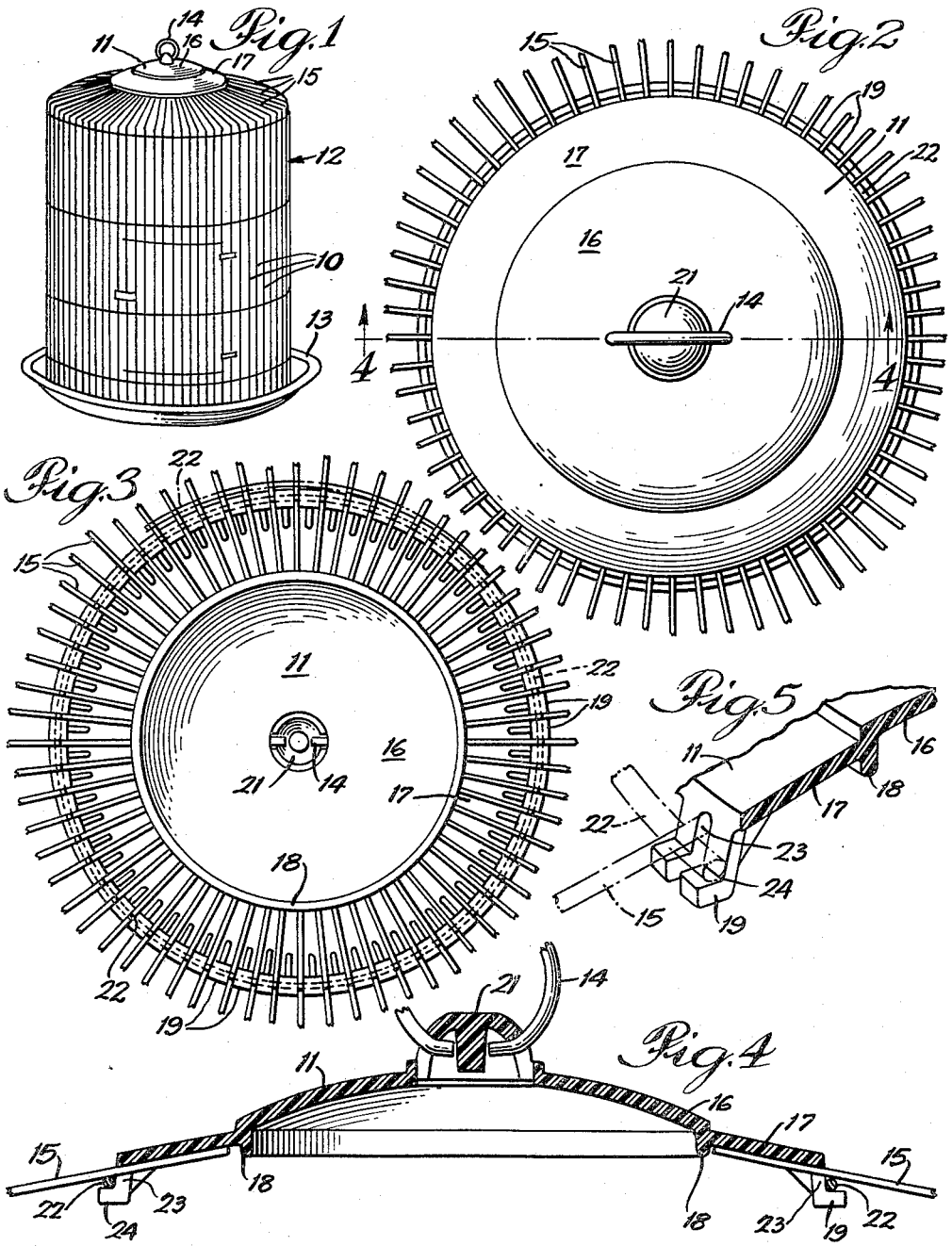

2,939,422

BIRD CAGE

Edward Yellin, Oak Park, Ill., assignor to Bernard Edward Co., a corporation of Illinois Filed Mar. 24, 1958, Ser. No. 723,212

3 Claims. (Cl. 119—17)

This invention relates to a cage, for example, a cage for animals such as birds and the like.

Cages for animals are in many cases formed of metallic wires which are attached to a base and to a member at the top which generally is equipped with a ring or the like for hanging the cage. Cages in recent years have had a trend to become higher and higher and generally the free ends of the wires forming the cage have been secured to a top retaining member or cap by welding. However, welding individual wires is time consuming and expensive and with the increased size of cages a problem has arisen in the current drop at the welding electrodes. When the cage is relatively small a number of wires could be welded at one time because the current drop to the electrode extending into the cage was not too great. However, when the current drop increases only one or two wires may be successfully welded at one time.

It is an object of the invention, therefore, to provide a retaining member for carriage forming members which eliminates welding entirely.

It is another object of the invention to provide a retaining member for cage forming members formed entirely of plastic.

It is an additional object of the invention to provide a retaining member for cage forming members in which a flexible snap member is easily positioned to cooperate with the retaining member for the retention of the cage forming members.

It is also an object of the invention to provide a cage construction which is considerably less expensive and easier to assemble than prior cages.

With these and other objects in view, my invention consists in the construction, arrangement and combination of the various parts of my device whereby the objects contemplated are attained, as hereinafter more fully set forth, pointed out in my claims, and illustrated in the accompanying drawings, wherein:

Figure 1 is a perspective view of a cage assembled in accordance with the invention;

Figure 2 is a partial top view of the cage shown in Figure 1 with the cage forming members broken adjacent the top retaining member for the sake of clarity;

Figure 3 is a view similar to Figure 2 looking upwardly from the bottom of the cage with the base member removed;

Figure 4 is a sectional view taken on line 4—4 of Figure 2; and

Figure 5 is an enlarged perspective view of a portion of the top retaining member with the snap member and the cage forming members shown in dotted lines.

Referring specifically to the drawing for detailed description of the invention, numeral 11 designates generally a retaining member for retaining cage forming members 12 in position relative to each other and to the retaining member 11. A base 13 is provided as shown in Figure 1 and the cage forming members 12 may be secured thereto by any suitable means. A ring 14 is attached to the retaining member 11 in any desired manner such as being snapped into a boss 21 at the top of the retaining member 11.

The cage forming members comprise a plurality of wire rods having vertically extending portions 10 and angularly extending portions 15. The rods are preferably formed of metal wire, although they may be formed of any other material such as plastic. It is noted that the angularly extending portions 15 of the cage forming members extend at an angle of approximately 10 degrees to the horizontal and it has been found that this angle is advantageous because of the retaining means utilized for the free ends of the cage forming members.

As best shown in Figures 4 and 5, the retaining member 11 is generally circular although it may be of other conventional configurations. It is provided with a central curved portion 16 and a peripheral generally flat portion 17. A flange 18 is preferably provided on the underside of the retaining member 11 at the juncture of the portions 16 and 17.

Generally L-shaped extensions 19 are provided at the periphery of the portion 17 of the retaining member 11 and are spaced to provide openings or slots 23. A flexible member 22 is also provided and in the embodiment shown it is generally circular in configuration, although if the retaining member 11 is of some other configuration than circular, the flexible member 22 would follow the general configuration of the retaining member 11.

In order to assemble the cage, particularly the top thereof, all that is necessary is to insert the free ends of the angular portions 15 of the cage forming members into the slots 23 in the retaining member 11 and then to snap the flexible ring 22 beneath the cage forming portions 15. The flexible member 22 is positioned between the cage forming members 15 and the corners of the extensions 19, which corners have been marked with the numeral 24. The flexible member 22, the cage forming members 15, and the slots 23 are so dimensioned that the cage forming members 15 will be held snugly at the top of the slots 23 with the flexible member 22 positioning itself firmly in the corners 24 of the extensions 19.

While it is usually unnecessary to disassemble a cage of this type this may be easily accomplished by merely removing the flexible member 22 and withdrawing the free ends of the cage forming members 12 from the retaining member 11.

While one embodiment of the invention has been shown and described in detail, it will be understood that this is for the purpose of illustration only and is not to be taken as a definition of the scope of the invention, reference being had for this purpose to the appended claims.

What is claimed is:

1. A cage including a plurality of individual cage forming members, portions of which extend generally vertically, said cage forming members at one portion thereof extending at an angle to the vertically extending portions and terminating in free ends, a retaining member for partially retaining the free ends in fixed relationship, said retaining member having slots therein and a plurality of angular extensions thereon, the free ends of said cage forming members extending into said slots, and a flexible member adapted to be positioned between said angular extensions and the portions of the extremities of said cage forming members to cooperate with said retaining member to complete the retention of said free ends of the cage forming members in fixed relationship to each other.

2. A cage including a plurality of individual cage forming members, portions of which extend generally vertically, said cage forming members at one portion thereof extending at an angle to the vertically extending portions and terminating in free ends, a generally circular retaining members for partially retaining the free ends in fixed relationship, said retaining member having openings therein and a plurality of angular extensions thereon, the free ends of said cage forming members extending into said openings, and a generally circular flexible member adapted to be positioned between said angular extension and the portions of the extremities of said cage forming members to cooperate with said retaining member to complete the retention of said free ends of the cage forming members in fixed relation to each other, said flexible member comprising a snap ring with a break therein at one point.

3. A cage including a plurality of individual cage forming members, portions of which extend generally vertically and cooperate to define cage sides, said cage forming members at one portion thereof extending at an angle to the vertically extending portions and terminating in free ends, said latter portions of the cage forming members which extend at an angle to the vertically extending portions cooperating to define a frusto-conical cage top which slopes from the conical apex downwardly and radially outwardly at an angle of about 10 degrees to the horizontal, a generally circular retaining member for partially retaining the free ends in fixed relationship, said retaining member having openings therein and a plurality of angular extensions thereon, the free ends of said cage forming members extending into said openings, and a generally circular flexible member adapted to be positioned between said angular extensions and the portions of the extremities of said cage forming members to cooperate with said retaining member to complete the retention of said free ends of the cage forming members in fixed relation to each other.

References Cited in the file of this patent

UNITED STATES PATENTS

| | | |
|---|---|---|
| 2,120,262 | Rodess | June 14, 1938 |
| 2,673,105 | Fitzgerald | Mar. 23, 1954 |